Sept. 15, 1931.  S. W. PHILLIPS  1,823,286
VEHICLE JACK
Filed March 11, 1929  2 Sheets-Sheet 1
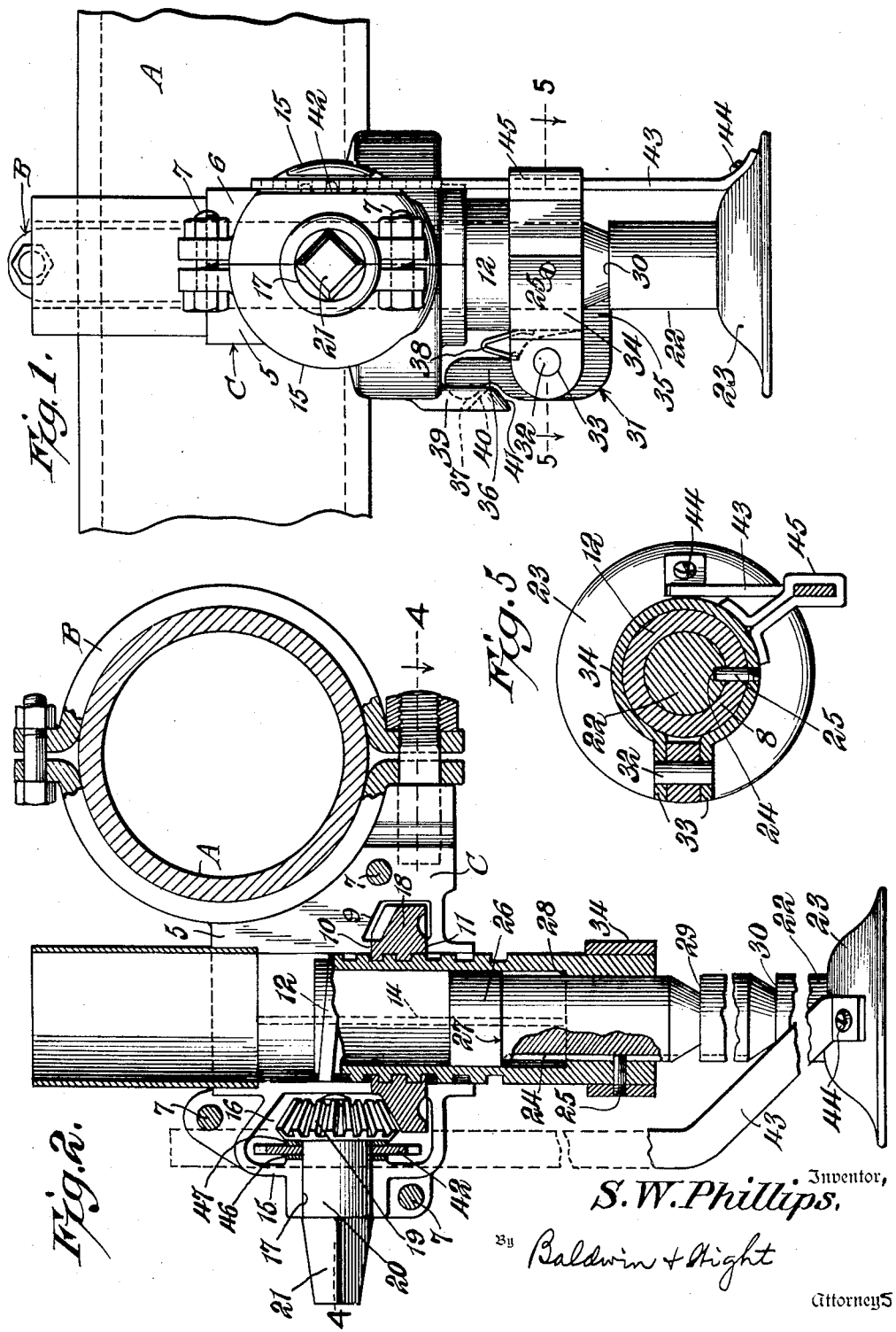

Sept. 15, 1931. S. W. PHILLIPS 1,823,286
VEHICLE JACK
Filed March 11, 1929 2 Sheets-Sheet 2
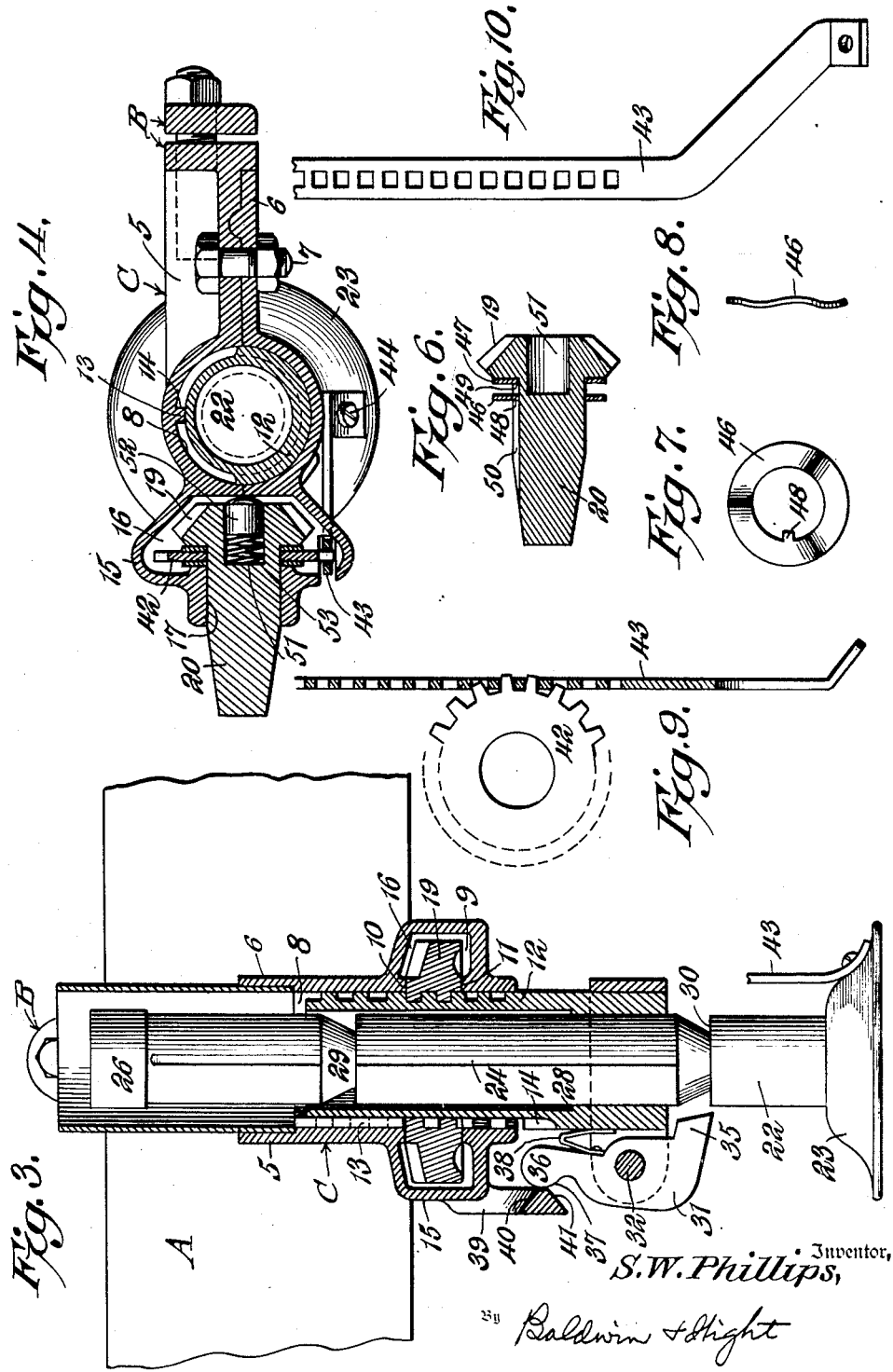
S. W. Phillips, Inventor,
By Baldwin & Hight
Attorneys.

Patented Sept. 15, 1931

1,823,286

UNITED STATES PATENT OFFICE

STEPHEN W. PHILLIPS, OF PROMPTON, PENNSYLVANIA

VEHICLE JACK

Application filed March 11, 1929. Serial No. 346,085.

This invention relates to new and useful improvements in vehicle jacks.

Among the several objects of my invention are to provide a jack which may be readily attached to a vehicle axle; to provide a jack which can be quickly operated to raise the vehicle, and to provide a jack which is composed of comparatively few parts and is therefore cheap to manufacture.

With these and other objects in view which will more fully appear, the nature of the invention will be more clearly understood by following the description, the appended claims, and the several views illustrated in the accompanying drawings.

In the accompanying drawings:

Figure 1 is an elevational view showing the application of my invention to a vehicle axle, the jack being shown in its normal or raised position, Figure 2 is a view taken at right angles to Figure 1 showing the jack resting on the ground prior to the vehicle being raised, part of the view being in section, Figure 3 is a detail view showing the position of the standard just prior to the foot reaching the ground, and showing the latch being momentarily held in its released position, Figure 4 is a horizontal section taken on the line 4—4 of Figure 2, Figure 5 is a horizontal section taken on the line 5—5 of Figure 1, Figure 6 is a detail sectional view of the drive shaft and pinion, and the spring washer connected therewith, Figure 7 is an elevational view of one of the washers, Figure 8 is an end elevation thereof, Figure 9 is a detail view showing the driving connection between the spur gear and the rack-bar, and Figure 10 is an elevational view of the rack-bar.

In the drawings, I have shown my improved jack as being attached to and normally supported above the ground by a vehicle axle A.

The jack includes a two part clamp B which is rigidly attached to the axle A, and a housing C which is rigidly connected to one of the parts of the clamp B. This housing comprises two parts 5 and 6 which are secured together by bolts 7, the part 5 being integral with one of the parts of said clamp.

Conjointly formed in the parts 5 and 6 of the housing is a vertical bore 8 which extends through the housing, and a horizontally disposed annular recess 9 which is concentric to and communicates with the bore 8. The recess 9 is located in the lower portion of the housing and includes upper and lower bearings 10 and 11 respectively.

Mounted in the bore 8 for relative vertical movements is an exteriorly threaded hollow screw or rod 12. An integral key 13 formed on the housing C extends into and cooperates with a keyway 14 formed in the periphery of the rod 12 to prevent rotation of the rod relative to the housing. The housing is also formed with a laterally extending offset 15 having a recess 16 formed therein which is in open communication with the recess 9. The offset 15 projects away from and in a direction at right angles to the longitudinal axis of the axle A. Formed in the outer wall of the offset 15 is a horizontally disposed bearing 17 having a longitudinal axis disposed in a radial plane relative to the bore 8.

Engageable with the exteriorly threaded rod 12, and mounted in the recess 9 between the bearings 10 and 11 thereof, is a driven bevel gear 18 which projects into the recess 16 and is in mesh with a driving pinion 19 fixed to a drive shaft 20 journaled in the bearing 17, the outer end 21 of the shaft being shaped for engagement by a wrench or other suitable tool. Thus, upon rotation of the shaft 20 the gear 18 will be rotated but will be held against vertical movements relative to the housing C by means of the upper and lower bearings 10 and 11, and the rotation of the gear 19 will move the rod 12 vertically relative to the housing C, or move the housing C relative to the rod, depending upon the conditions hereinafter described.

Mounted within the hollow rod 12 for relative longitudinal movements, is the upper end of a standard 22 having a ground-engaging foot 23 fixed to its lower end. The standard is formed with a longitudinally extending key-way 24, and a pin or key 25 is mounted in the rod 12 for engagement in the key-way to retain the standard 22 against rotation relative to the rod 12. The upper end of the standard is provided with a head 26 forming a resultant shoulder 27 which cooperates with a stop shoulder 28 formed in the lower portion of the bore 8 to limit the downward movement of the standard 22. The standard 22, between the foot 23 and the head 26, is provided with upper and lower notches or seats 29 and 30 respectively. A latch or detent 31 is pivotally mounted on a pin 32 which is supported in ears 33, 33 of a band 34 which surrounds and is rigidly connected to the lower end of the screw rod 12. This latch includes a substantially horizontally disposed latch arm 35 and an upwardly extending and substantially vertically disposed actuating arm 36 having a cam 37 at its outer end. A spring 38 interposed between the actuating arm 36 and the screw 12, functions to normally retain the latch arm 35 in the lower recess or seat 30 of the standard 22 as shown in Figure 1. An arm 39 which depends from and is integral with the housing C is provided with upper and lower cam surfaces 40 and 41 respectively, which separately function to release the latch when the screw rod 12 is moved downwardly relative to the housing C, as shown in Figure 3, or when the housing C is moved downwardly relative to the screw rod 12.

Journaled on the drive shaft 20 between the offset 15 of the housing C and the driving pinion 19, is a spur gear 42 which meshes with a vertically disposed rack bar 43 having its lower end fixed to the foot 23 by a screw 44 or other means. A guide arm 45 for the rack-bar is fixedly connected to the band 34 and functions to maintain the rack-bar in alinement with the spur gear 42. Disposed around the drive shaft 20 on opposite sides of the gear 42 are spring washers 46 and 47, the washer 46 being located between the offset 15 of the housing C and the gear 42, and the washer 47 being located between the gear 42 and the pinion 19. The washers are respectively provided with tongues or keys 48 and 49 which engage in a groove or key-way 50 formed in the drive shaft 20 and function to prevent rotation of the washers relative to the shaft. Formed in the inner end of the drive shaft 20 is an axial bore 51 for housing a stud 52. The outer end of the stud 52 is rounded for contact with the housing, and a coil spring 53 is located in the bore 51 and bears at its ends against the inner end of the bore and against the stud 52. The spring 53 functions to urge the drive shaft 20 outwardly to compress the washers 46 and 47 against opposite faces of the spur gear 42. Thus, if the standard 22 is not latched or otherwise retained against vertical movement, the frictional contact between the washers and the spur gear will be sufficient to rotate the gear and thereby raise or lower the rack-bar 43 together with the foot 23 and standard 22, the distance traveled by the rack-bar and standard 22 being much greater than the distance traveled by the screw rod 12. On the other hand, if the standard is retained against vertical movement in either direction, the spur gear 42 will not be rotated with the drive shaft 20 owing to slippage between the washers and the gear.

In operation, assume the jack is elevated and is in the position shown in Figure 1 and it is desired to raise the vehicle. The driving pinion 19 is rotated in a clockwise direction and the driven bevel gear 18 will move the hollow screw rod 12 downwardly. The latch 31, which is pivoted to the rod 12, will move downwardly therewith and the cam 37 of the actuating arm 36 will engage the stationary cam 40 on the housing and thereby swing the latch arm 35 out of engagement with the lowest notch 30 in the jack standard 22. Until this disengagement is effected, the spur gear 42 will not rotate with the driving pinion, as the friction washers 46—47 will slip. Continued rotation of the driving pinion in the same direction will cause the spur gear 42 to move the rack-bar 43 downwardly to position the foot 23 on the ground and simultaneously rotate the driving gear to further move the screw rod downwardly but for a considerably less distance than the distance of movement of the rack-bar. This movement of the screw rod 12 positions the cam 37 of the latch below the cam arm 39. Further downward movement of the screw rod 12 will result in the latch arm 35 engaging the upper notch 29 under the influence of the spring 38. Consequently further downward movement of the screw rod 12 will be arrested, and continued rotation of the driving pinion 19 will raise the housing C and the vehicle. If the vehicle is sufficiently elevated, the spur gear 42 which is moved upwardly therewith, will be moved out of driving connection with the rack-bar 43. The rack-bar, however, will remain in position for reengagement with the spur gear by means of the stationary guide 45 which is fixed to the screw spindle. The engagement between the threads of the driven gear 19 and the threads of the screw rod 12 will lock the vehicle in its raised position.

When it is desired to lower the vehicle, and return the rack bar 43 and foot 23 to their normal positions, the driving pinion is rotated in an anti-clockwise direction, and the vehicle will be lowered on the now stationary screw rod 12 until the latch cam 41 causes the latch 31 to be swung and disengaged from the upper notch 29 on the jack standard 22. During this downward movement of the vehicle, the rack-bar 43 will be reengaged with the spur gear 42, but the bar will not be moved upwardly until the latch 31 is released, the spur gear slipping relative to the driving pinion. Upon continued rotation of the driving pinion, the spur gear 42 will raise the jack and simultaneously the driven gear 19 will raise the screw rod 12 until the parts are returned to their normal positions, the latch 31 slipping into the lower notch 30 on the jack standard 22 and serving to hold the latter against downward movement.

It will be observed that the gears 19 and 18, the hollow rod 12 and the latch 31 constitute disconnectable positive driving connections between the drive shaft 21 and the standard 22, and that the latch also serves as a releasable means for detachably connecting said drive shaft to said standard, and adapted when released to render the positive driving connections inoperative. The friction washers 46 and 47, the spur gear 42 and the rack 43 constitute frictional driving connections between the drive shaft and the standard for effecting relatively rapid movement of the latter when the positive driving connections are inoperative.

I claim:

1. The combination with a fixed part of a vehicle, of a jack comprising a housing attached to said fixed part, an exteriorly threaded hollow rod mounted in the housing for vertical movements relative thereto, a driven gear journaled in the housing and meshing with said rod, means including a driving shaft for rotating said driven gear, a foot, a standard extending from the foot into said hollow rod, and connections between the standard and the driving shaft and separate from the rod for moving the foot and the standard vertically relative to the rod.

2. The combination with a fixed part of a vehicle, of a jack comprising a housing attached to said fixed part, an exteriorly threaded hollow rod mounted in the housing for vertical movements relative thereto, a driven gear journaled in the housing and meshing with said rod, means including a driving shaft for rotating said driven gear, a foot, a standard extending from the foot into said hollow rod, a latch connection between the hollow rod and the standard for normally retaining the standard against movement relative to said rod, means for automatically releasing said latch when the rod is moved a predetermined distance, and connections between the standard and the driving shaft and separate from the rod for moving the foot and the standard vertically relative to the rod subsequent to the release of said latch.

3. The combination with a fixed part of a vehicle, of a jack comprising a housing attached to said fixed part, an exteriorly threaded hollow rod mounted in the housing for vertically movements relative thereto, a driven gear journaled in the housing and meshing with said rod, means including a driving shaft for rotating said driven gear, a foot, a standard extending from the foot into said hollow rod, and connections between the standard and the driving shaft and separate from the rod for moving the foot and the standard vertically relative to the rod, said connections moving the foot and the standard a distance greater than the distance the rod is moved.

4. The combination with a fixed part of a vehicle, of a jack comprising a housing attached to said fixed part, an exteriorly threaded hollow rod mounted in the housing for vertical movements relative thereto, a driven gear journaled in the housing and meshing with said rod, means including a driving shaft for rotating said driven gear, a foot, a standard extending from the foot into said hollow rod, connections between the standard and the driving shaft and separate from the rod for moving the foot and the standard vertically relative to the rod, said connections including a rack-bar connected to the standard, and a spur gear mounted on the drive shaft for engaging the rack-bar.
5. The combination with a fixed part of a vehicle, of a jack comprising a housing attached to said fixed part, an exteriorly threaded hollow rod mounted in the housing for vertical movements relative thereto a driven gear journaled in the housing and meshing with said rod, means including a driving shaft for rotating said driven gear, a foot, a standard extending from the foot into said hollow rod, a latch connection between the hollow rod and the standard for normally retaining the standard against movement relative to the hollow rod, means for automatically releasing said latch when the rod is moved a predetermined distance, connections between the standard and the driving shaft and separate from the rod for moving the foot and the standard vertically relative to the rod subsequent to the release of said latch, said connections including a rack-bar connected to the standard, a spur gear journaled on the drive shaft for engaging the rack-bar, and means for frictionally connecting said spur gear to said drive shaft to move said rack bar when said latch is released, said means being adapted to permit rotation of the drive shaft relative to the spur gear when the latch is engaged.

6. The combination with a fixed part of a vehicle, of a jack comprising a housing attached to said fixed part, an exteriorly threaded hollow rod mounted in the housing for vertical movements relative thereto, a driven gear journaled in the housing and meshing with said rod, means including a driving shaft for rotating said driven gear, a foot, a standard extending from the foot into said hollow rod, said standard having upper and lower notches, a spring latch pivoted on the hollow rod and normally engaging the lower notch to hold the standard against downward movement, means for automatically releasing the latch when the rod is moved downwardly a predetermined distance, and connections between the standard and the driving shaft and separate from the rod for moving the standard downwardly subsequent to the release of said latch and for a sufficient distance to permit the latch to engage the upper notch.

7. The combination with a fixed part of a vehicle, of a jack comprising a housing attached to said fixed part, an exteriorly threaded hollow rod mounted in the housing for vertical movements relative thereto, a driven gear journaled in the housing and meshing with said rod, means including a driving shaft for rotating said driven gear, a foot, a standard extending from the foot into said hollow rod, said standard having upper and lower notches, a spring latch pivoted on the hollow rod and normally engaging the lower notch to hold the standard against downward movement, means for automatically releasing the latch when the rod is moved downwardly a predetermined distance, connections between the standard and the driving shaft and separate from the rod for moving the standard downwardly subsequent to the release of said latch and for a sufficient distance to permit the latch to engage the upper notch, said connections including a rack-bar connected to the standard, a spur gear journaled on the drive shaft for engaging the rack-bar, and means for frictionally connecting said spur gear to said drive shaft to move said rack bar when said latch is released, said means being adapted to permit rotation of the drive shaft relative to the spur gear when the latch is engaged.

8. The combination with a fixed part of a vehicle, of a jack comprising in combination, a housing secured to said fixed part, a standard carried by said housing and mounted for vertical sliding movements relative thereto, a drive shaft journalled for rotary movement relative to the housing, disconnectable positive driving connections between said drive shaft and said standard for effecting positive and relatively slow movement of said standard and including releasable means for detachably connecting said drive shaft to said standard and adapted when released to render said positive driving connections inoperative and frictional driving connections between said drive shaft and said standard for effecting relatively rapid movement of said standard when said positive connections are rendered inoperative.

In testimony whereof, I have hereunto subscribed my name.

STEPHEN W. PHILLIPS.